Patented May 13, 1952

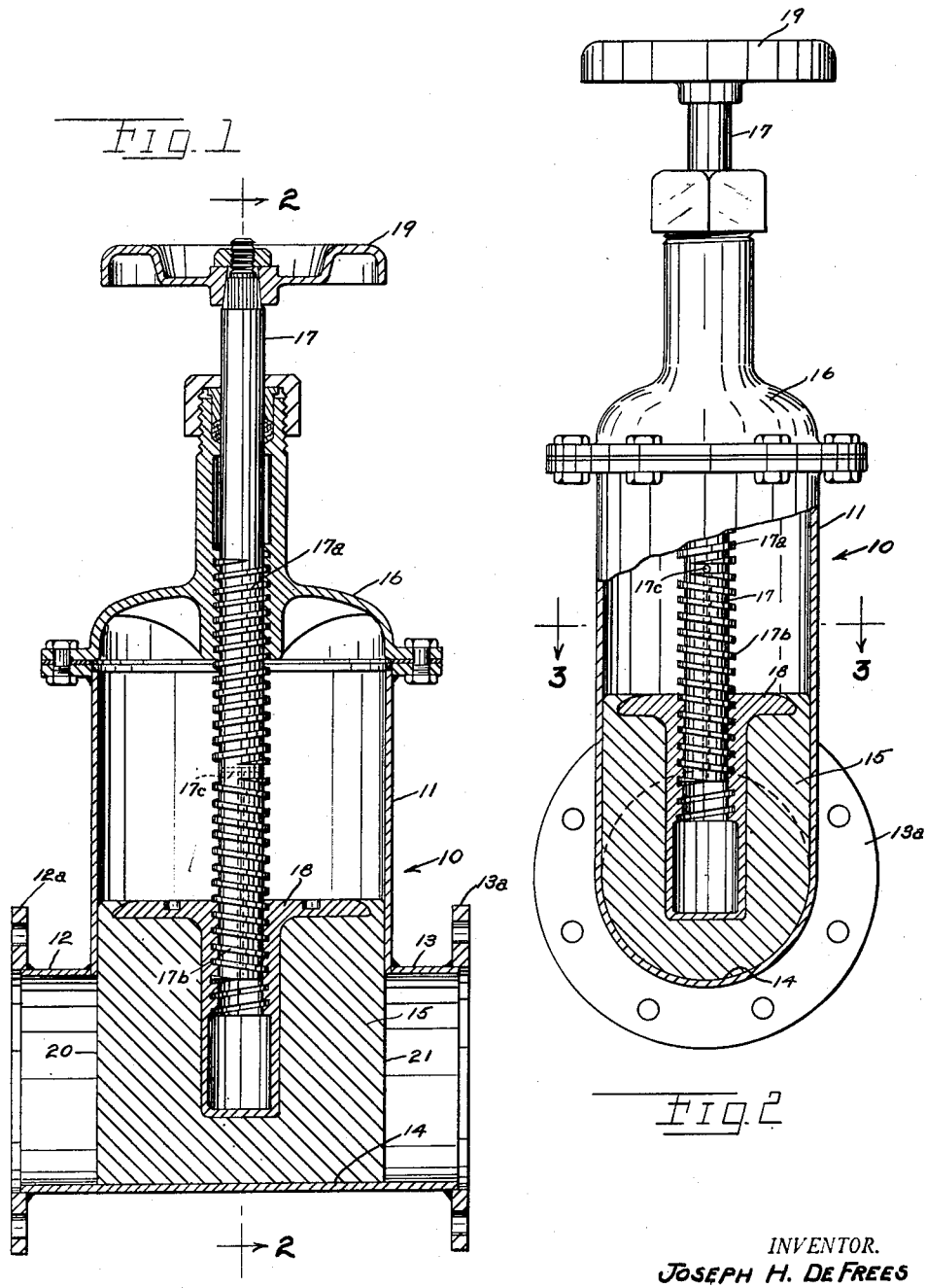

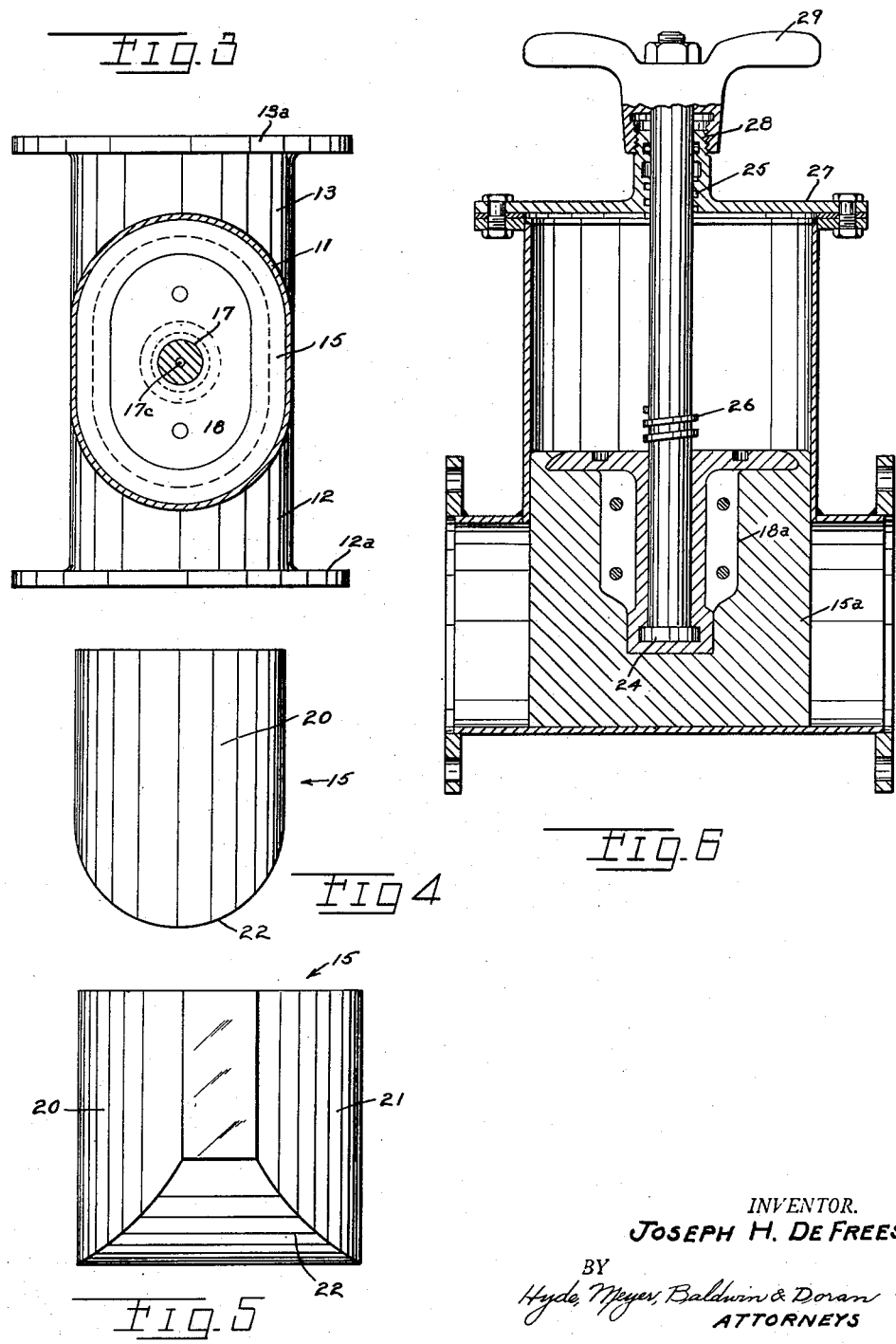

2,596,891

UNITED STATES PATENT OFFICE 2,596,891

EXPANDING PLUG FOR GATE VALVES

Joseph H. De Frees, Warren, Pa.

Application November 20, 1948, Serial No. 61,198

2 Claims. (Cl. 251—66)

1

The invention relates to valves, and more particularly to valves for controlling fluid flow in conduits and the like.

An object of the invention is to provide a valve adapted to be constructed in simple and economic fashion, the complementary head and seat for which require no precision machine finishing operations. A further object of the invention is to provide a valve as defined in the last preceding paragraph which is especially adapted for the control of low pressure flow or gravity flow of fluids. A further object is the elimination of all metal-to-metal seats, and the provision of a much more positive closure than the conventional disc type gate valve.

Other objects and advantages of my invention will be apparent from the following specification, in conjunction with the accompanying drawings in which;

Fig. 1 is a vertical sectional view of one example of a valve embodying my invention;

Fig. 2 is a vertical sectional view, partly in side elevation, the sectioned portion being taken on the line 2—2 of Fig. 1;

Fig. 3 is a top plan view of the embodiment shown in Figs. 1 and 2;

Fig. 4 is an end elevational view of the valve plug member, as it appears from the left in Fig. 1;

Fig. 5 is a side elevational view of the valve plug member, as it appears from the left in Fig. 4; and Fig. 6 is a vertical sectional view of another embodiment of my valve invention.

Referring now to the drawings, and particularly to Figs. 1 to 5, there is shown a valve body or housing, generally referred to by reference character 10, having a vertical portion 11 of tubular construction defining a chamber here shown as being generally oval in cross section. The lower end of this body portion is provided with conventional transverse tubular extensions 12 and 13 having respective flanges 12a and 13a for connection in a fluid-carrying conduit. As will appear, the vertical portion of the valve chamber defines the path of valve head travel, and the horizontal portion (and more specifically the lower semicylindrical portion 14 of the inner wall thereof) defines the valve seat.

A slidable plug 15 of resilient character, such as natural or synthetic rubber, or generally similar deformable composition, is slidably movable within vertical housing 11 and is identical in cross section contour with the oval bore of said vertical housing. The elongated character of the plug prevents plug rotation during subsequent operation, as will be described.

The upper end of the valve body is capped by a bonnet 16 centrally bored and threaded to receive a valve stem 17. A thimble or ferrule 18 is embedded in the plug 15 and has a rotatable connection with the lower end of stem 17. I prefer to substitute a threaded connection for a simple rotatable connection since it enables me to provide a right hand thread 17a on the portion of the stem which rotates in the bonnet bore, and a left handed thread 17b on the portion of the stem which rotates in the ferrule. The stem is vented at 17c to permit free movement in the ferrule. The use of the double thread arrangement multiplies the rate of travel of the plug when the control knob 19 is rotated.

The lower face 22 of the plug (Figs. 4 and 5) is formed to a cylindrical planar contour substantially conforming to the inner wall surface 14 of the transverse portion of the valve chamber (Figs. 1 and 2). The contour of the plug is well shown in the sectional views, Figs. 1 and 2, and the side elevational views, Figs. 4 and 5, and it will be apparent from a consideration of Figs. 2 and 5 that fluid flow is prevented by contact of the lower curved face 22 of the plug with the inner curved wall 14 of the valve housing. Since, as previously described the plug is of oval contour in horizontal section, and its major axis extends in the direction of the fluid transmitting conduit, the sealing contact surface is of substantial extent. The end faces 20, 21 of the valve plug are struck off in approximately equal radii from spaced centers within the plug, and along its major axis.

While the valve housing 10 shown in the drawings is made by the welded union of two sheet metal tubes, it can be integrally cast in one piece, with the subsequent connection thereto of bonnet 16.

Fig. 6 shows a slightly modified form of the invention wherein the thimble 18a is split vertically to permit the insertion therein of a stem end having a laterally projecting flange 24, the stem and flange being freely rotatable within the thimble. In this type of structure, after insertion of the stem end between the thimble halves, and securement of the halves by riveting or otherwise connecting the halves at 18b, the plug 15a is molded on the thimble.

In this embodiment as shown in Fig. 6, rapid opening and closing of the valves is effected in the following manner. The valve stem has only one threaded section 26 of limited extent just above the point where the stem enters the thimble. The bonnet 27 has an internally threaded bore 26, and an external thread 28 which mates with an internal thread on control knob 29. To open the valve, one or two turns of the control knob 29 disengages the knob from its retaining threaded connection on thread 28. The stem may then be rapidly lifted vertically until the stem thread 26 engages the bonnet bore, after which a fractional turn of the stem holds the valve in open position. Obviously, performance of these operations in reverse order produces rapid closing of the valve.

Some instances of resilient plug valves have been disclosed in the prior art, but my present novel valve is the first instance in which the simple yet novel oval contour of the plug functionally cooperates with the normal inner contour of a fluid conduit, giving an extended sealing surface which requires no special grinding or machining operation. Slight advance of the stem upon valve closure effects sealing pressure on the plug by means of the thimble. The plug can therefore be identical in external dimension with the internal dimension of the bore. No flattened or otherwise off-shaped seats or recesses need be formed in the bore, and the bore need not be enlarged. This is a positive advantage since enlargement of the bore would result in a pressure drop through the conduit.

As a further result of the structure hereinabove described, the use of my novel and improved gate valve plug permits one hundred per cent drainage which is not the case with conventional gate valves, or with any other valve structures previously known to me. This is highly important in the food and chemical industries where contamination is a serious problem.

In a valve structure such as I have hereinabove described, and illustrated in the accompanying drawings, it is necessary that the recess in the valve body within which the valve plug is slidable should be of the same width as the transverse area of the passage through which the fluid flows, so that advance of the plug into seating contact with the inner surface of the opposite wall 14 of the passage effectively blocks all fluid flow through said passage. This is best seen in Fig. 2 wherein the width of the plug and of the recess defined by the vertical portion of the valve chamber is seen to be equal to the full diametrical width of the fluid passage defined by the tubular extensions 12 and 13. It is also highly desirable that the plug, and consequently the recess in which it is slidably movable, be of greater longitudinal extent than the diametrical extent of said fluid passage, to achieve the advantages heretofore noted.

What I claim is:

1. A valve assembly comprising a valve body having a passage therein for the transmission of fluid, said assembly consisting of a first tubular section of cylindrical character for said transmission of fluid, and a second tubular section intersecting said first tubular section at right angles thereto in T-connecting relationship, said second tubular section being adapted to slidably receive a valve plug for movement into said first tubular section to control fluid flow therein, said second tubular section being of oval sectional contour in a plane parallel to the axis of said first tubular section, said second tubular section having along its major diameter a pair of opposed parallel side walls spaced apart a distance equal to the diameter of said first tubular section, said distance constituting the minor diameter of said second tubular section, said parallel side walls merging smoothly into rounded end walls, said major diameter of said second tubular section extending in the direction of the longitudinal axis of said first tubular section, the parallel walls of said second tubular section merging smoothly and tangentially into the walls of the first said tubular section at respectively diametrically opposed zones in the first tubular section, said valve plug being formed from relatively resilient material and having an inner seating face of elongated semi-cylindrical character at its mid-portion so as to be adapted to seat against the opposed inner wall of said first tubular section, said plug having side walls and end walls respectively complementary to the inner side and end walls of said second tubular section, said plug extending rearwardly away from its said seating face a distance greater than the cylindrical diameter of said first tubular section whereby, when said plug has been advanced within said second tubular section and into seating contact with its seat on said opposed inner wall of said first tubular section a portion of said plug will completely obstruct the passage in said first tubular section, and another portion of said plug will extend rearwardly into and completely obstruct the cross sectional space within said second tubular section.

2. In a valve body of the character described a first tubular section of cylindrical contour for the transmission of fluid therethrough, a second tubular section of oval contour intersecting said first tubular section in T-connecting relationship and adapted to slidably receive a plug for advance movement into said first tubular section to block fluid flow therein and for retraction out of said first tubular section to permit fluid flow therein, said plug having an external contour conforming to the internal periphery of said second tubular section, said plug having a bottom face adapted to maintain sealing contact with the opposed wall of said first tubular section, said plug being formed from resilient material, the contour of the sealing faces of said plug resulting from the integral union of a body portion, two end portions, and a bottom portion, said body portion consisting of a rectangular hexahedron, said end portions being of generally semi-cylindrical character, convex outwardly, and merging smoothly into said body portion at opposed ends thereof, and said bottom portion being likewise of generally semi-cylindrical character, convex outwardly, and merging smoothly into said body portion and, at its ends, into said end portions, the cylindrical axis of said end portions being perpendicular to the cylindrical axis of said bottom portion, and all three said cylindrical axes lying in a common plane, the plug dimension consisting of the height of the body portion plus the semi-diameter of the bottom portion exceeding the diameter of said first tubular section, the plug dimension consisting of the width of the hexahedral body portion being substantially equal to the diameter of said first tubular section, the plug dimension consisting of the length of the body portion plus the semi-diameters of the end portions being substantially equal to the major diameter of said second tubular section.

JOSEPH H. DE FREES.

REFERENCES CITED

The following references are of record in the file of this patent:

UNITED STATES PATENTS

| Number | Name | Date |
|---|---|---|
| 273,271 | Gibbons | Mar. 6, 1883 |
| 1,004,845 | Bohme | Oct. 3, 1911 |
| 1,088,616 | Palmer | Feb. 24, 1914 |
| 1,089,160 | Scherr | Mar. 3, 1914 |
| 1,172,924 | Barry | Feb. 22, 1916 |
| 1,500,908 | VanDerson | July 8, 1924 |
| 1,869,741 | DuBois | Aug. 2, 1932 |
| 2,151,296 | Knoerzer | Mar. 21, 1939 |
| 2,401,123 | Volpin | May 28, 1946 |

FOREIGN PATENTS

| Number | Country | Date |
|---|---|---|
| 2,711 | Great Britain | of 1874 |
| 372,482 | Great Britain | of 1932 |
| 581,468 | France | of 1924 |